United States Patent [19]
Anderson

[11] Patent Number: 6,042,726
[45] Date of Patent: Mar. 28, 2000

[54] APPARATUS FOR FILTERING INDUSTRIAL LIQUIDS

[75] Inventor: Raymond Anderson, Walled Lake, Mich.

[73] Assignee: H.R. Black Co., Inc., Warren, Mich.

[21] Appl. No.: 09/123,276

[22] Filed: Jul. 28, 1998

[51] Int. Cl.[7] .......................... B01D 33/056; B01D 29/09; B23Q 11/00
[52] U.S. Cl. .......................... 210/297; 210/298; 210/393; 210/400; 210/406
[58] Field of Search .................................. 210/400, 401, 210/168, 406, 393, 297, 298

[56] References Cited

U.S. PATENT DOCUMENTS

| | | |
|---|---|---|
| 3,087,620 | 4/1963 | Hirs . |
| 3,197,030 | 7/1965 | Black . |
| 3,464,563 | 9/1969 | Dahlem . |
| 3,570,674 | 3/1971 | Dahlem . |
| 3,706,378 | 12/1972 | Markwick ............................ 210/107 |
| 4,242,205 | 12/1980 | Hirs ...................................... 210/400 |
| 4,390,428 | 6/1983 | Bratten . |
| 4,440,642 | 4/1984 | Frese . |
| 5,089,143 | 2/1992 | Anderson ............................ 210/741 |

FOREIGN PATENT DOCUMENTS 569108  11/1993  European Pat. Off. .

Primary Examiner—Thomas M. Lithgow
Attorney, Agent, or Firm—Charles W. Chandler

[57] ABSTRACT

A filtration apparatus designed to remove solid contaminants from a liquid includes an endless filtration belt located in a liquid tank, so that liquid flows through minute openings in the belt into a liquid collection box located within the belt envelope. Edge areas of the belt are engaged with annular support walls carried by the tank side walls, such that a continuous seal is provided against migration of contaminants around the belt side edges. Contaminants collecting on the belt surface can be periodically removed by moving the belt across a spray system that dislodges the contaminants from the belt into the tank. A drag conveyor removes contaminants from the tank.

6 Claims, 2 Drawing Sheets

APPARATUS FOR FILTERING INDUSTRIAL LIQUIDS

BACKGROUND OF THE INVENTION

This invention is related to an apparatus for filtering industrial liquids and more particularly to an apparatus having a horizontal continuous conveyor supporting filtering media mounted inside or above an elongated continuous drag conveyor.

Some industrial processing liquids, such as machine coolant, are processed through a filtering media so that the liquid can be recycled through the processing apparatus. Typically the liquid is delivered to a tank having a filtering medium mounted on either a cylindrical or an elongated continuous conveyor. The liquid is passed through the filtering media, to a vacuum chamber and then delivered from the vacuum chamber for recycling through the processing system. A drag conveyor is commonly used for removing sludge or debris that accumulates in the bottom of the filtering tank.

Examples of such prior art may be found in U.S. Pat. Nos. 5,089,143 issued Feb. 18, 1992 to Raymond L. Anderson, for Method of Filtering Industrial Liquids and Apparatus therefore; 3,706,378 issued Dec.19, 1972 to John P. Markwick for Automatic Endless Belt Type Filter; and 4,242,205 issued Dec. 30, 1980 to Gene Hirs for Traveling Belt Filter.

SUMMARY OF THE INVENTION

The broad purpose of the present invention is to provide an improved traveling belt type apparatus for filtering industrial liquids comprising an elongated horizontal loop type filter belt enclosed within (or above) a drag chain conveyor. This permits the capacity of the filter to be enlarged simply by elongating the length of the filter loop.

The endless loop type filtration belt is supported by means of two endless annular support walls projecting from the tank side walls, whereby the annular support walls provide a continuous seal against liquid flow around the belt side edges. The sealing action is achieved at relatively low construction expense.

Another object of the invention is to provide means for driving both the drag chain conveyor and the filter belt by a single motor. The filter belt has two chains connected along the loop side edges. A first set of sprockets engages the chains outside the filter belt loop while a second set of sprockets engages drive chains on the drag conveyor. A single motor has drive connections to the drive shafts for each set of sprockets, so as to simplify the drive system.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
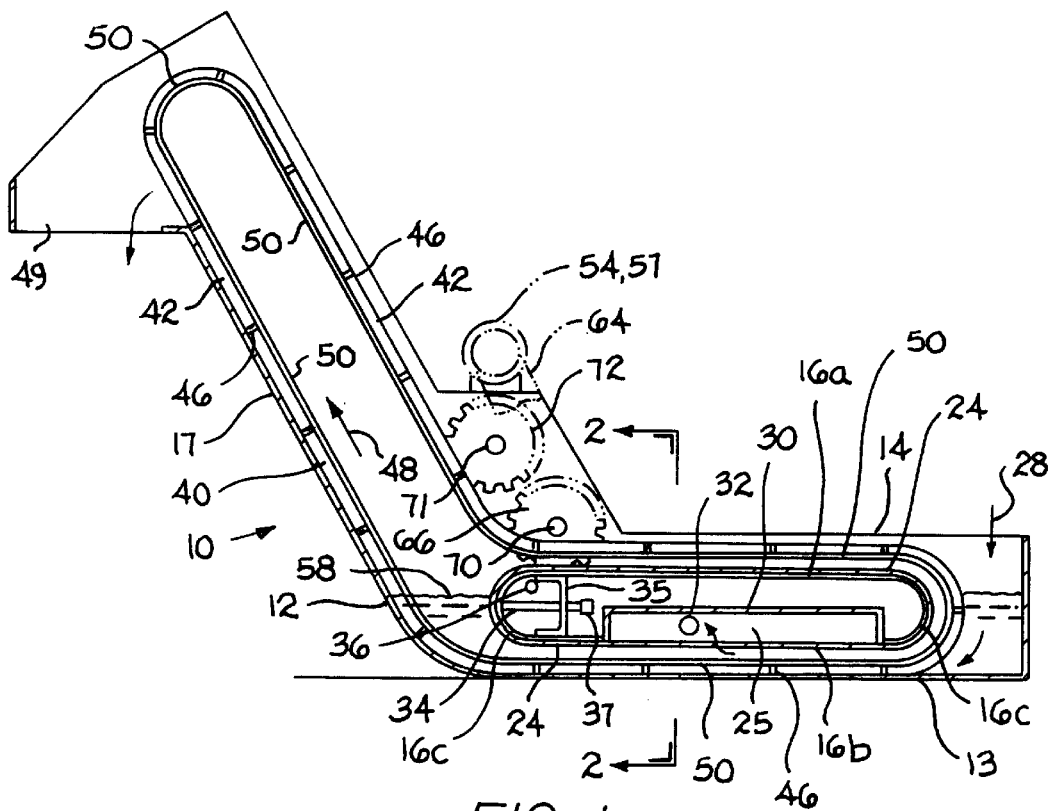
FIG. 1 is a sectional view of one form of filter apparatus illustrating the invention taken on line 1—1 in FIG. 2.
Figure 2:
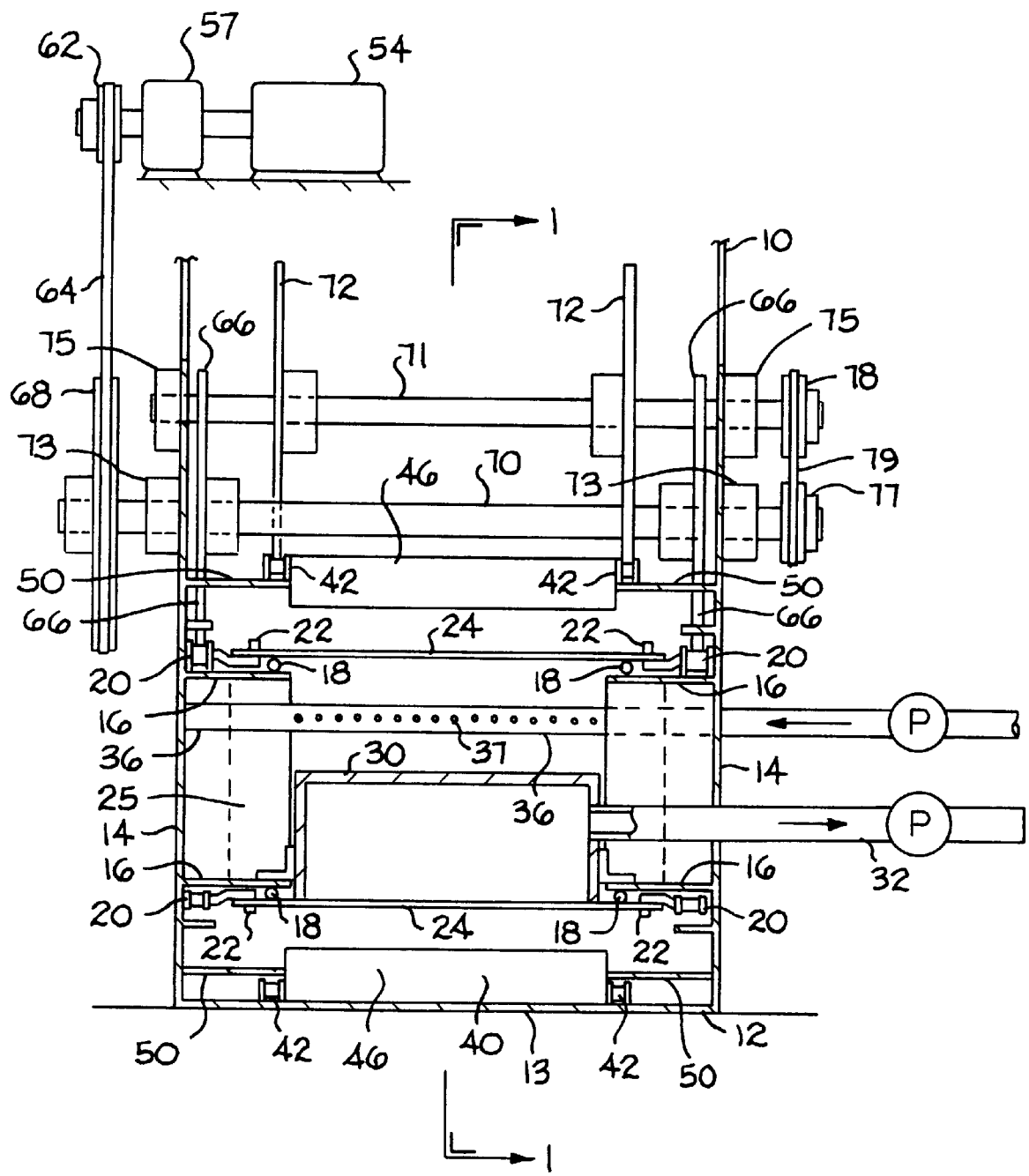
FIG. 2 is an enlarged sectional view generally as seen along lines 2—2 of FIG. 1.

Referring to FIGS. 1 and 2, a vacuum assisted filtration apparatus generally illustrated at 10 includes a tank 12 with spaced side walls 14. A pair of opposed annular support walls 16 extend inwardly from side walls 14 to mount at their inner longitudinal edges a continuous sealing bead 18. As viewed in FIG. 1, each annular support wall 16 comprises an upper horizontal wall section 16a, a lower horizontal wall section 16b, and two curved (semi-circular) wall sections 16c. The wall sections form a continuous annular support surface for the side edge areas of an endless filtration belt 24 that spans the space between the two support walls 16.

A pair of spaced endless drive chains 20 are slideably mounted on support walls 16 for moving the endless filtration belt in a plane paralleling side walls 14. The drive chains include regularly spaced upturned hooks 22 that are received within longitudinally spaced grommets on opposite longitudinal edges of the porous filtration belt 24 disposed within the tank. Filtration belt 24, for illustrative purposes, is a conventional filtering media such as a permanent monofilament material having a mesh opening chosen according to the nature of the material being removed from the liquid by the filtration process.

Support walls 14 and filtration belt 24 cooperatively circumscribe a central space 25 adapted to contain the filtered liquid. Contaminants collect on the outer surfaces of filtration belt 24, whereas the purified liquid flows through the filtration belt into the circumscribed space 25. For convenience purposes the circumscribed space can be considered as an outlet chamber.

The contaminated liquid (laden with particulates produced during machining operations) is initially delivered to the tank in the direction of arrow 28, and then drawn through the filter medium into an opening in the under side of vacuum box 30 located within outlet chamber 25. The filtered fluid then passes outwardly through a conduit 32 under the impetus of a conventional vacuum pump, not shown, for delivery to the parts processing apparatus.

As noted earlier, contaminants collect on the outer surfaces of endless annular filtration belt 24. In order to ensure that the surface of belt filtration belt 24 aligned with the opening in collection box 30 is relatively clean (unobstructed) the belt is moved along the surfaces of annular support wall 16 so as to traverse a contaminant removal mechanism 36. As shown in FIGS. 1 and 2, mechanism 36 comprises a liquid spray means adapted to spray pressurized streams of liquid against the inner surface of filtration belt 24, whereby contaminants on the belt outer surface are dislodged from the belt. These dislodged contaminants eventually settle to the bottom wall 13 of the tank, where they are removed by a drag conveyor 40.

Liquid spray means 36 can comprise a horizontal pipe extending transversely through tank 12 above the liquid level 58 prevailing in the tank. Nozzle openings 37 are formed along the pipe for discharging jets of liquid onto the inner surface of filtration belt 24, to discharge the contaminants from the belt surface. Spray means 36 is located above the tank liquid level 58 in order to permit the spray to be effective on the belt contaminants.

Liquid level 58 can be maintained by conventional flow control systems, e.g. a liquid level switch in the tank for controlling a solenoid valve in the liquid supply line that delivers the contaminated liquid into the tank, as represented by arrow 28 in FIG. 1.

Filtration belt 24 is moved over endless annular support walls 24 by two drive sprockets 66, 66 that are in mesh with endless chains 20, 20. A chain tightening apparatus 34 can be adjusted to maintain the tension of each chain 20 at a satisfactory level. Thus, a vertical wall 35 is connected at the left ends of wall sections 16a and 16b to threadably support an adjustment screw 37. The associated curved end wall section 16c is floatable so that rotation of screw 37 horizontally adjusts wall section 16c, thereby setting the chain tension. Each chain 20 has its own tension adjustment mechanism. Each vertical wall 35 has flanges that seal the cracks between the end wall section 16c and the horizontal wall sections 16a, 16b, while at the same time supporting end wall section 16c.

A drag conveyor 40 is mounted in the tank in a continuous loop. The drag conveyor comprises a pair of conveyor chains 42 and a series of spaced bars 46. The bars can move along the bottom of the tank to carry the sludge upwardly in the direction of arrow 48 and out through outlet port 49, as indicated by arrow 52. The drag conveyor is supported by walls 50 that extend inwardly from the tank side walls 14. Walls 50 slidably engage drive chains 42 that carry bars 46, whereby transitional motion of the chains advances bars 46 along an endless path along the includes tank bottom wall 13 and inclined wall 17 leading to outlet port 49.

The endless filtration belt 24 and drag conveyor 40 are driven by a single drive motor 54. The shaft of motor 54 connects to a speed reducer 57 that has an output shaft suitably mounting a drive pulley 62. The aforementioned drive sprockets 66 for chains 20 are mounted on a transverse drive shaft 70 that extends through bearings 73 on the tank side walls 14. Shaft 70 carries a pulley 68 that is aligned with drive pulley 62. A drive belt 64 is trained around pulleys 62 and 68. When electric motor 54 is energized, belt 64 transmits a rotary drive force to shaft 70 so that sprockets 66 are rotated to drive the filtration belt 24 in orbital fashion along the outer surfaces of support walls 16.

Chains 42 of the drag conveyor are in mesh with two additional sprockets 72 carried on a second shaft 71. Bearings 75 on the tank side walls 14 support shaft 71 for rotary motion. As shown in FIG. 2, shafts 70 and 71 have pulleys 77 and 78 radially aligned to receive a drive transmission belt 70. Thus, while shaft 70 is rotating to drive sprockets 66, the second shaft 71 is being rotated (by drive belt 79) to drive sprockets 72. It will be seen that, with the illustrated drive system the filtration belt 24 and drag conveyor 40 are both driven by the single power source (motor) 54.

As shown in FIG. 1, drag conveyor 40 encircles the endless filtration belt 24, i.e. the upper run of the drag conveyor extends above the filtration belt, whereas the lower run of the drag conveyor extends below the filtration belt (on tank bottom walls 13). However, the drag conveyor can be arranged to lie entirely underneath the endless filtration belt, as shown in FIG. 3.

Figure 3:
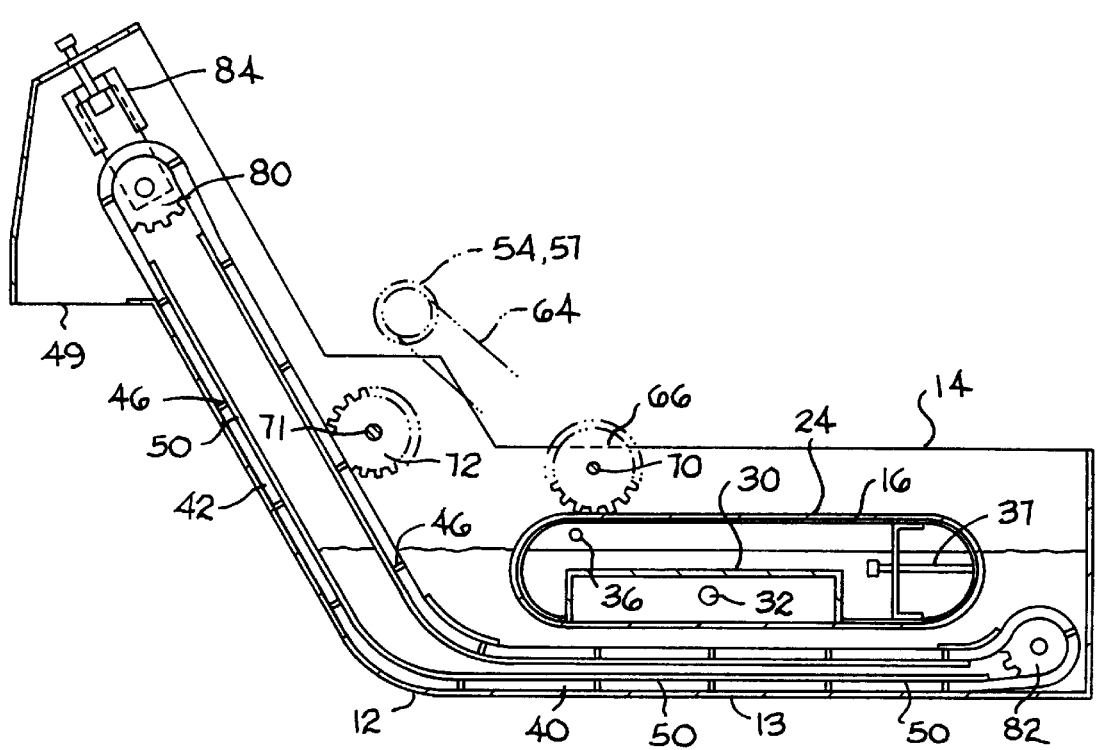
FIG. 3 is a sectional view taken in the same direction as FIG. 1, but illustrating another embodiment of the invention.

With the FIG. 3, arrangement, the drag conveyor is required to experience relatively abrupt changes in direction between the upper run and the lower run. Therefore, idler sprockets 80 and 82 are provided to accomplish the directional changes smoothly without undue frictional losses or wear. It will be understood that each drive chain 42 of the drag conveyor has its own idler sprockets 80, 82. A chain tension adjustment means 84 can be provided for each drive chain 42.

The drive system for the filtration belt 24 and drag conveyor 40 in the FIG. 3 arrangement can be essentially the same as the drive system used in the FIG. 1 arrangement. Preferably a single drive motor 54 is used in both cases.

A major feature of the invention is the drive system for filtration belt 24 and the drag conveyor 40. A single power source 54 is operatively connected to the drive elements 66 and 72 for belt 24 and conveyor 40. The drive system is located above the liquid in tank 12 such that the shaft bearings do not require special seals to keep out the liquid contaminants. The system has a good service life.

The filtration system can be equipped with sensors for detecting the build up of contaminants on filtration belt 24. When a contaminant build up is detected, motor 54 can be energized to move the filtration belt 24 across the contaminant removal mechanism 36. At other times motor 54 can be in a de-energized condition.

The drawings necessarily show specific structural forms of the invention. However, it will be appreciated that the invention can be practiced in various forms and configurations.

Having described my invention, I claim:

1. A filtration apparatus comprising:

a tank for receiving a liquid containing impurities to be filtered;

said tank having two upstanding side walls, and a bottom wall;

an endless annular support wall projecting from each side wall of said tank above the tank bottom wall;

an endless filtration belt spanning the space between said support walls, said filtration belt having marginal side edges thereof telescoped onto said support walls, whereby said endless support walls seal against liquid flow around the belt side edge;

said annular support walls and said endless filtration belt cooperatively forming a liquid outlet chamber;

means for drawing filtered liquid out of said outlet chamber, whereby solid impurities collect on the belt surface and on the tank bottom wall;

means for moving said belt in an orbital motion along said support walls;

means for removing solid impurities that collect on the belt surface;

a drag conveyor for removing solid impurities from the tank bottom wall;

said belt moving means comprising a first set of endless drive chains forming a first pair of chain loops extending along the marginal side edges of said belt, a first set of rotary sprockets (66, 66) meshed with said first set of endless chains, outside of the first pair of chain loops and a first drive shaft connecting the sprockets in said first set;

means for moving said drag conveyor, comprising a second set of endless drive chains forming a second pair of chain loops, a second set of rotary sprockets (72, 72) meshed with said second set of endless chains, outside the second pair of chain loops and a second drive shaft connecting the sprockets in said second set; and a single power means having drive connections with said first and second drive shafts, whereby said filtration belt and said drag conveyor are both moved by said single power means.

2. The filtration apparatus of claim 1, in which the tank has a liquid level, and including means for supporting the first set of rotary sprockets (66, 66) and the second set of rotary sprockets (72, 72) above said liquid level.

3. The filtration apparatus of claim 1, wherein said drive shafts are each rotatable on horizontal axes that extend transverse to the tank sidewalls.

4. The filtration apparatus of claim 1, wherein each endless annular support wall comprises an upper horizontal wall section, a lower horizontal wall section, and two curved end wall sections joining said upper and lower wall sections so as to form a continuous annular wall; said endless filtration belt conforming to the contour of said continuous annular wall.

5. The filtration apparatus of claim 1, wherein said means for drawing filtered liquid out of said outlet chamber comprises a liquid collection box located within said outlet chamber, and means for applying a vacuum force to said liquid collection box.

6. The filtration apparatus of claim 1, wherein said means for removing solid impurities from the belt surface comprises liquid spray means located in said outlet chamber, said spray means being oriented to spray pressurized liquid through said belt to dislodge solid impurities from the belt surface.

* * * * *